United States Patent [19]

Haeffner

[11] Patent Number: 5,667,680

[45] Date of Patent: Sep. 16, 1997

[54] ARRANGEMENT IN LIQUID FILTERS IN WHICH THE FILTRATE IS DIVIDED IN TWO FRACTIONS

[75] Inventor: Roger Clarence Haeffner, Älta, Sweden

[73] Assignee: Nordic Water Products AB, Nynashamn, Sweden

[21] Appl. No.: 545,612

[22] PCT Filed: Apr. 26, 1994

[86] PCT No.: PCT/SE94/00369

§ 371 Date: Oct. 25, 1995

§ 102(e) Date: Oct. 25, 1995

[87] PCT Pub. No.: WO94/25139

PCT Pub. Date: Nov. 10, 1994

[30] Foreign Application Priority Data

Apr. 28, 1993 [SE] Sweden ................... 9301438

[51] Int. Cl.[6] ................................... B01D 33/21
[52] U.S. Cl. .................. 210/331; 210/378; 210/380.3; 210/403
[58] Field of Search .................. 210/403, 196, 210/784, 378, 380.3, 324, 331

[56] References Cited

U.S. PATENT DOCUMENTS

| 2,464,617 | 3/1949 | Sebald ................ 210/196 |
| 3,163,601 | 12/1964 | Ericson et al. . |
| 5,330,646 | 7/1994 | Frykhult ............. 210/331 |

FOREIGN PATENT DOCUMENTS

| 704050 | 2/1965 | Canada .............. 210/403 |
| 1008617 | 10/1965 | United Kingdom . |

*Primary Examiner*—Peter A. Hruskoci
*Assistant Examiner*—Betsey J. Morrison
*Attorney, Agent, or Firm*—Young & Thompson

[57] ABSTRACT

A liquid filter comprises a filter rotor with filtering elements and a container for the filtrate. The filtrate is divided in two fractions, a coarse pre-filtrate derived from that side, where the rotor dives into the liquid, and a clear filtrate derived from the opposite side. The pre-filtrate fraction is extracted from the filtrate space such that the filtrate at the side of the container is forced to pass through a number of openings lying close to the liquid surface of the filtrate and leading to a pre-filtrate outlet, whose openings are spaced apart relative to each other and distributed along the rotor.

5 Claims, 4 Drawing Sheets

ARRANGEMENT IN LIQUID FILTERS IN WHICH THE FILTRATE IS DIVIDED IN TWO FRACTIONS

FIELD OF THE INVENTION

The invention relates to an arrangement in liquid filters comprising a liquid container and a filter rotor with filtering means partly immersed in the liquid container, in which the filtration is carried out. The surface of the incoming liquid suspension within the filter rotor is kept at a higher level than the liquid surface of the filtrate outside the rotor in the container.

BACKGROUND OF THE INVENTION

In such filters it is unavoidable that the filtrate will be more unpurified at that side, where the filtering means, usually filtering cloth, dives into the liquid. Later during each revolution the deposited filter layer will serve as filtering medium and the filtrate will be successively cleaner. Thus, the filtrate will have a coarser structure at that side, where the periphery of the rotor moves in a downward direction, and a finer structure at the opposite side of the container. This will have a negative effect on the total efficiency of the filter.

In order to reduce this drawback it has previously been proposed to divide the filtrate in two fractions, a so called pre-filtrate and a so called clear filtrate, the pre-filtrate fraction being derived from that side, where the filtrate has a coarser structure, and the clear filtrate fraction from the opposite side. The pre-filtrate fraction can then for example be returned to the unfiltered liquid suspension.

The present invention relates to filters having this facility and more particularly it relates to an arrangement in filters as described in the preamble, in which a pre-filtrate fraction is produced by discharge means situated at that side of the container, where the periphery of the rotor moves in the downward direction into the liquid for extracting the pre-filtrate fraction from the filtrate in the container at said side, while a clear filtrate fraction is derived from the opposite side of the container, where the periphery of the rotor moves in an upward direction from the liquid surface.

In the previously proposed known filter constructions the discharge means for producing the pre-filtrate fraction are shaped as conventional overflow means having an axial extension substantially corresponding to the length of the rotor.

A drawback for this known solution is that it is difficult to adjust the overflow means such that a desired pre-filtrate fraction is obtained, in particular when the total filtrate flow varies. Thus, if for example the total filtrate flow increases with 10% the pre-filtrate fraction discharged via the overflow means of conventional type can increase with 25–45% of the total filtrate flow, which of course is disadvantageous from an economical point of view. In case of disc filters, the overflow means for the pre-filtrate will be several times longer than the overflow means for the clear filtrate, if the said first overflow means are brought to follow the filtering surfaces on the rotor, which is necessary for achieving a satisfactory function. In this ease a small variation of the total filtrate flow will lead to a drastic variation of the pre-filtrate fraction.

SUMMARY OF THE INVENTION

It is an object of the present invention to reduce this drawback for the previously proposed solution and to produce a filter construction, in which the pre-filtrate fraction is less dependent on the total filtrate flow than in the known filters and furthermore can be adjusted to a desired magnitude.

According to the invention this is achieved by the fact that the discharge means comprise a number of openings in a wall separating the filtrate space at said side of the container from an outlet for said pre-filtrate, said wall with its openings being so arranged that the openings are situated opposite the filtering means on the filter rotor near the liquid surface of the filtrate and are spaced apart relative to each other along the filtering means of the rotor, through which openings the pre-filtrate fraction can flow to said outlet.

In principle the invention consists in that the pre-filtrate is forced to flow through a number of restricted openings, which are distributed in spaced relationship to each other along the rotor, and this has proved to result in that the variation of the pre-filtrate fraction with variations of the total filtrate flow is reduced essentially and furthermore it has resulted in that a more accurate regulation of the pre-filtrate fraction is possible, for example, if required, by adjusting the flow area of said openings.

In one practical embodiment of the invention the wall provided with openings is a container wall defining the filtrate space at said side of the container and in this case the openings can be formed in the upper edge of said wall with the upper limit of the openings situated at a higher level than the liquid surface of the filtrate, and the lower limit of the openings situated at a lower level than the liquid surface of the filtrate. Thus, in this case the openings will form a number of restricted overflow means, through which the pre-filtrate can flow to said outlet. It has proved to be advantageous if the openings then are so shaped that they have a smaller horizontal extension at the bottom, whereby the flow area of the openings will vary with the total filtrate flow.

In order to increase the total efficiency of so called drum type filters, the upper edge of said wall provided with openings can be situated below the rotor inside the horizontal projection of the rotor as seen in horizontal cross section. Consequently, at least some of the coarsest pre-filtrate will flow directly from the rotor to an outlet for the pre-filtrate outside the container wall.

In a second embodiment of the invention the wall comprises at least one closed tube communicating with an outlet for the pre-filtrate and provided with longitudinally spaced openings for the pre-filtrate, which tube is so arranged in the container that the openings are below the liquid surface of the filtrate.

The invention can be used both in so called drum filters comprising a drum shaped rotor and so called disc filters comprising a rotor consisting of a number of axially spaced, hollow discs provided with filtering means on their sides. In both cases the wall provided with openings for the pre-filtrate shall be situated opposite and close to the filtering surfaces of the rotor, which in case of disc filters means that said wall has portions extending into the interspace between adjacent discs.

In one embodiment of the invention adapted to disc filters a number of horizontally arranged closed tubes extend into the interspace between each pair of adjacent discs, which tubes communicate with a common outlet for the pre-filtrate. The closed tubes can lead to an open channel and means can then furthermore be arranged for regulating the flow of pre-filtrate from each individual tube. Thereby an effective control of the pre-filtrate drainage process will be obtained, and desired adjustments can be made.

BRIEF DESCRIPTION OF THE DRAWINGS

The invention is illustrated by means of example with reference to the accompanying drawings, in which.

DETAILED DESCRIPTION OF THE INVENTION

Figure 1:
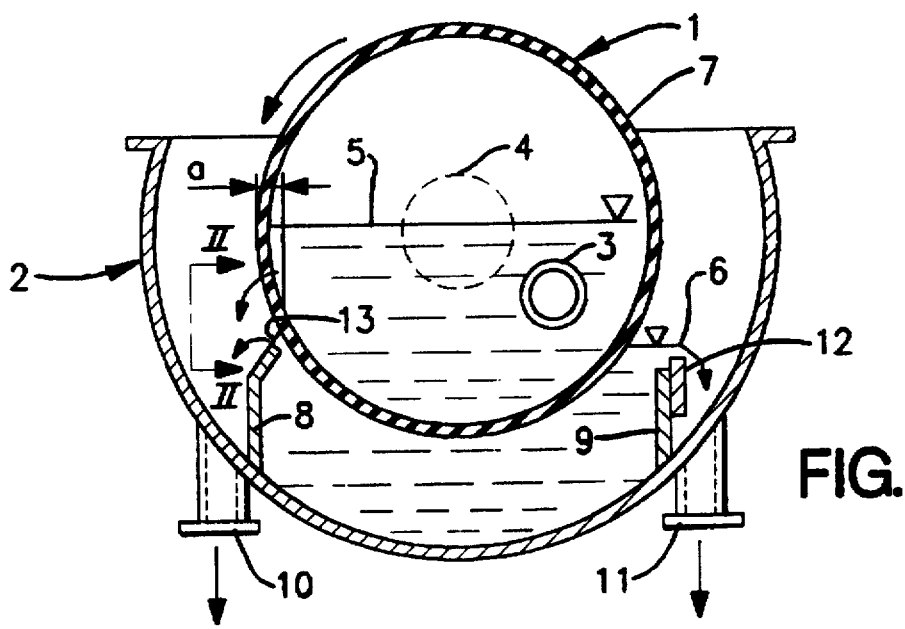
FIG. 1 is a schematic sectional view of a drum filter.

Refering to FIG. 1 a drum shaped filter rotor 1 is arranged in a container 2 having an inlet 3 and a drive mechanism 4. As a result of the fact that the surface 5 of the incoming liquid suspension within the filter rotor is kept at a higher level than the liquid surface 6 of the filtrate outside the filter rotor the filtrate will be forced to pass through the filtering means 7 (usually a filtering cloth). The filtrate will always be most unpurified at that side, where the cleansed filtering cloth dives into the liquid, i.e. the left hand side in FIG. 1. Later during each revolution, the filtering layer will serve as filtering medium and the filtrate will be progressively cleaner. The coarse filtrate at said side, where the rotor periphery moves downwardly, can be called pre-filtrate, while the cleaner filtrate at the opposite side can be called clear filtrate.

Figure 3:
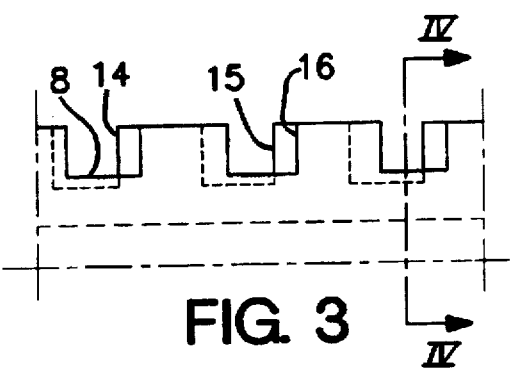
FIG. 3 is a variant of FIG. 2.

As shown in FIG. 1 the filtrate space is limited by two longitudinal walls 8, 9 and there are two filtrate outlets, a pre-filtrate outlet 10 and a clear filtrate outlet 11. The wall 9 is provided with an adjustable overflow device 12. The wall 8 is suitably arranged below the filter rotor i.e. the distance a is made so large that a certain amount of pre-filtrate will flow directly to the pre-filtrate outlet 10. According to the invention the wall 8 is at the top provided with a number of openings 13, which suitably can be of triangular shape with the apex directed downwards. However the openings can be of any arbitrary shape and, if desired, the size and/or number of the openings can be adjusted. An example of this is shown in FIG. 3, where the openings 16 in the wall 8 are of rectangular shape An elongate plate 14 has corresponding recesses 15, which are in overlapping relationship to the openings 16 in the wall 8. The plate 14 is longitudinally displaceable and thus by displacement of plate 14 the effective overflow area can be varied.

Figure 2:
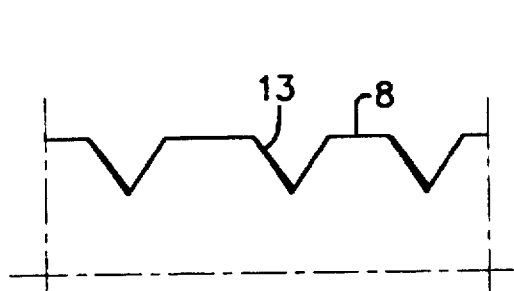
FIG. 2 is a partial view along line II—II in FIG. 1.

The embodiment shown in FIGS. 1 and 2 operates in such manner that the liquid level of the filtrate can be varied by means of the overflow device 12 and at any variation of the liquid level 6 of the filtrate a different amount of pre-filtrate will be discharged. Due to the triangular openings 13 the exact desired pre-filtrate fraction of the total filtrate flow can rapidly and accurately be obtained, and upon variations of the total filtrate flow only a small variation of the pre-filtrate fraction will be obtained. (In the conventional construction a variation of the total filtrate flow will result in a heavily varying fraction of pre-filtrate).

In the embodiment shown in FIG. 3 the desired pre-filtrate fraction is set by longitudinal displacement of the plate 14.

Figure 5:
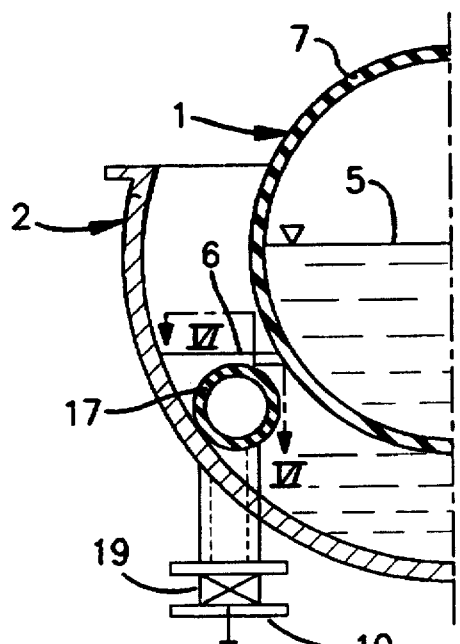
FIG. 5 is a sectional view of a variant.
Figure 4:
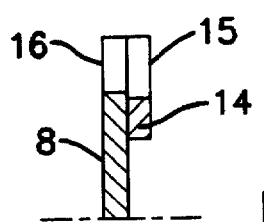
FIG. 4 is a sectional view taken along line IV—IV in FIG. 3.
Figure 6:
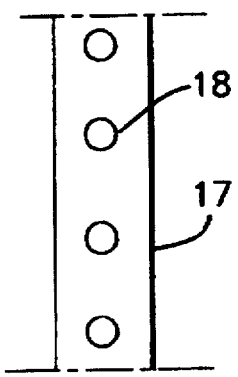
FIG. 6 is a partial view along line VI—VI in FIG. 5.

FIG. 5 shows a modification in which the wall containing the openings for the pre-filtrate is constituted by a closed tube 17 communicating with the pre-filtrate outlet 10, which tube 17 is arranged in a horizontal position below the liquid surface 6 of the filtrate. As evident from FIG. 6 the tube 17 has in its top surface a number of openings 18, which are axially distributed in spaced relationship to each other along the tube and through which openings the pre-filtrate can flow to the outlet 10. In the shown embodiment there is furthermore a regulation valve 19 arranged in front of the pre-filtrate outlet 10. An advantage of this construction is that the pre-filtrate flow also can be regulated by means of the valve 19, which is simpler than adjusting an overflow device.

Figure 7:
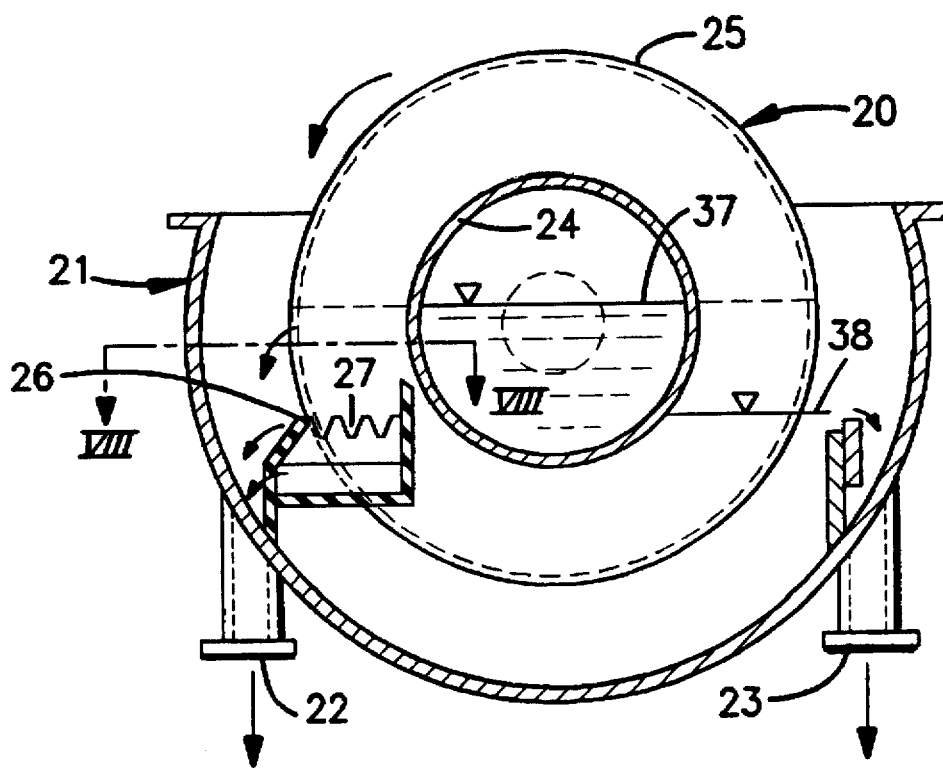
FIG. 7 is schematic sectional view of a so called disc filter.
Figure 8:
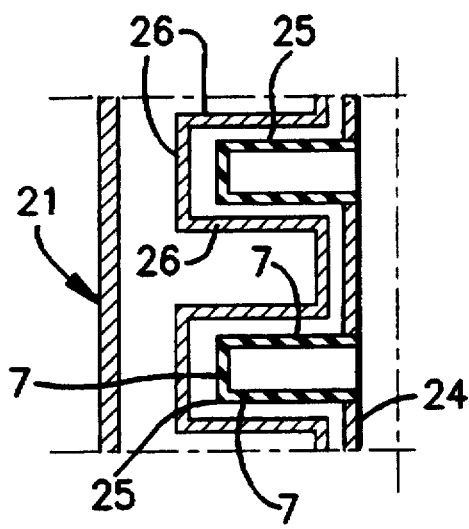
FIG. 8 is a part of a sectional view taken along line VIII—VIII in FIG. 7.

FIG. 7 is a sectional view of a so called disc filter. This filter comprises a filter rotor 20 arranged in a container 21 having a pre-filtrate outlet 22 and a clear filtrate outlet 23. The filter rotor consists of a shaft 24, on which a number of hollow filter discs 25 are mounted in axially spaced relationship to each other. The discs are in usual manner provided with filtering means 7 (FIG. 8), usually filtering cloth, both on the plan sides and the peripheral cylindrical sides. The surface of the incoming liquid suspension within the rotor is designated 37 and the liquid surface of the filtrate in the container outside the rotor is designated 38. As shown the surface 37 is kept at a higher level than surface 38, whereby the liquid within the rotor is forced to pass through the filtering means 7 to the space outside the rotor.

In principle all the examples of the inventive arrangement shown in FIGS. 1–6 can be used in connection with the disc filter according to FIG. 7. The embodiment of the invention shown in FIGS. 7 and 8 corresponds in principle to the embodiment of FIG. 1. As evident from FIG. 8 a vertical container wall 26 limiting the filtrate space at the left hand side of the container—the pre-filtrate side, where the periphery of the rotor moves in a downward direction—extends at a small distance from those sides of the rotor, which are provided with filtering cloth, thus "following" the contour of the discs, as seen in a horizontal view. In its upper edge in height with the liquid level the side wall 26 has a number of openings 27 serving as overflow means for the pre-filtrate. The openings 27 can suitably be of triangular shape as shown in FIGS. 2 and 7.

Figure 9:
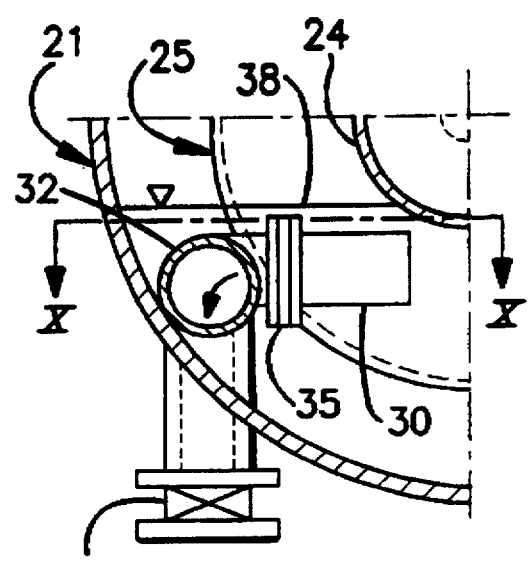
FIG. 9 is a variant.

FIG. 9 shows in principle the same realization of the inventive idea as FIG. 5 but adapted to a disc filter. In this case a number of closed tubes 30 with openings 31 in their top surfaces are arranged in horizontal position between the filter discs 25 and connected to a collection tube 32, which also in certain cases can be provided with openings 33. Also in this embodiment the regulation of the pre-filtrate flow can in addition be effected by means of a regulation valve 34 placed in front of the pre-filtrate outlet. At least in case of filters having large extension it can be advantageous to arrange valves or replaceable restriction means 35 between the tubes 30 and the collection tube 32. Using this construction the risk of unbalance in the pre-filtrate streams from the tubes 30 will be eliminated.

Figures 10, 12:
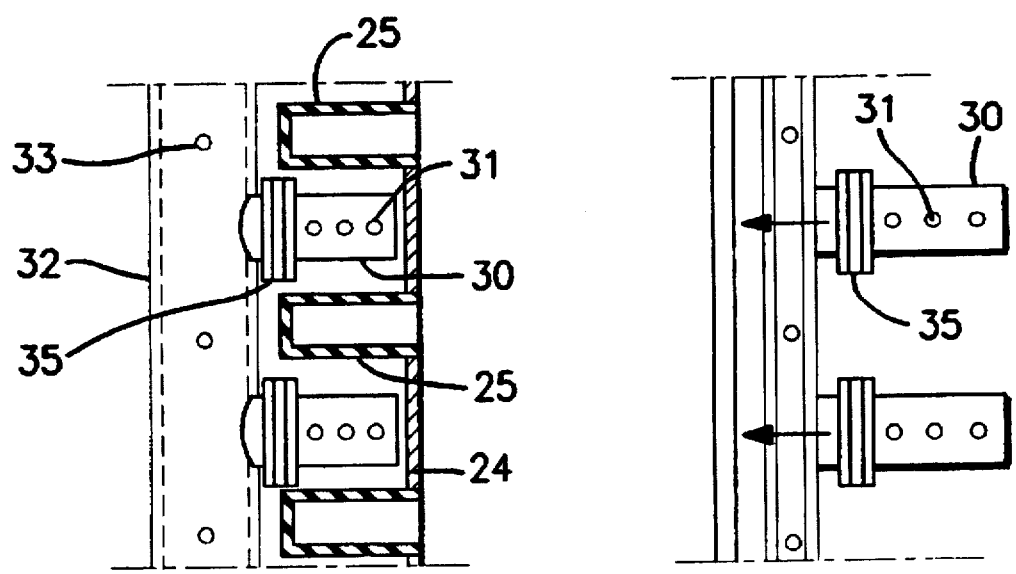
FIG. 10 is a part of a sectional view taken along line X—X in FIG. 9.
FIG. 12 is a part of a sectional view taken along line XII—XII in FIG. 11.
Figure 11:
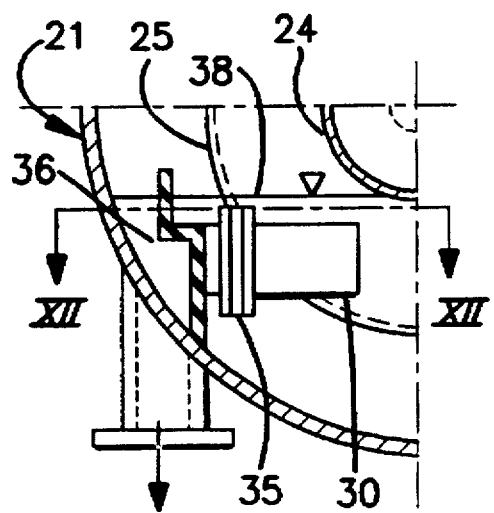
FIG. 11 is a further modification.

FIGS. 11 and 12 illustrate a further modification. The collection tube 32 is in this case replaced by an open channel 36 leading to the pre-filtrate outlet. This embodiment has the advantage that it will be possible to visually check the pre-filtrate flow from the tribes 30 (In FIG. 12 the filter rotor is not shown).

Figure 14:
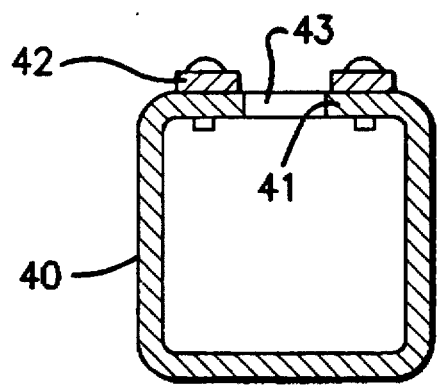
FIG. 14 and 15 are sectional views taken along lines XIV—XIV and XV—XV, respectively, in FIG. 13.
Figure 13:
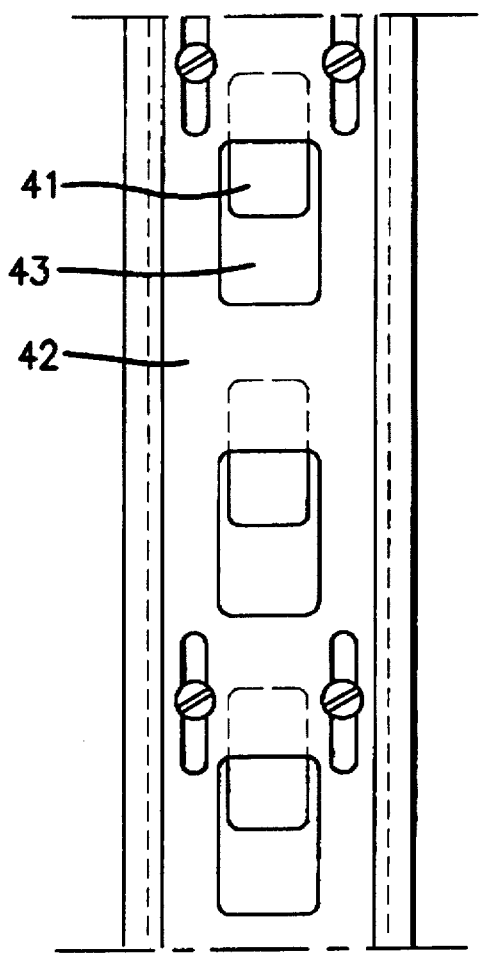
FIG. 13 is a plan view of a modification of FIG. 6.
Figure 15:
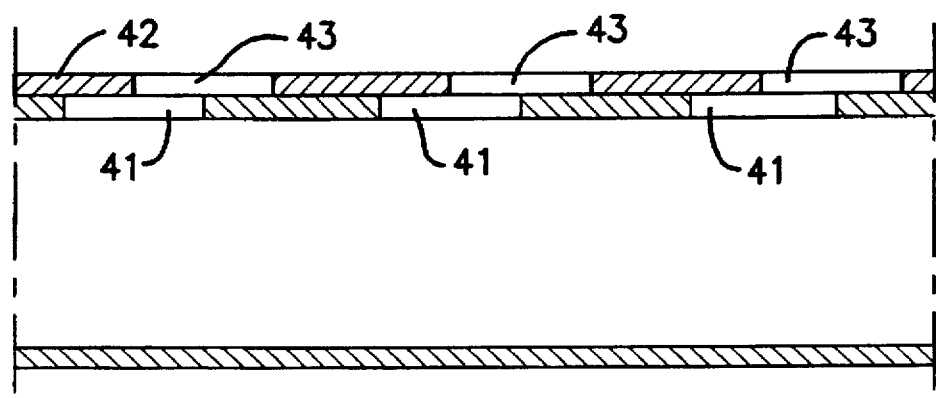

FIG. 13 is a plan view and FIGS. 14 and 15 are sectional views taken along line XIV—XIV and XV—XV, respectively, in FIG. 13 of an arrangement, which can be used in connection with the embodiments according to FIGS. 9–12 in order to regulate the pre-filtrate flow in a simple manner. In FIGS. 13–15 a tube 40, corresponding to tube 30, or possibly also tube 32, in previous Figures and in the shown example generally of square section, has in its top surface a number of rectangular holes 41, which are spaced apart relative to each other and distributed along the length of the tube An elongate, longitudinally displaceable plate 42 provided with corresponding holes 43 is placed upon the top surface of the tube 40 in such a position that the holes 41 and 43 partly overlap each other. Thus, by displacement of plate 42 the effective flow area for the pre-filtrate and thereby the amount of pre-filtrate flowing to the pre-filtrate outlet can be regulated.

I claim:

1. An apparatus for filtering liquids, comprising:
   a horizontal filter rotor with a number of axially spaced, hollow vertical discs provided with filtering means on the sides thereof;
   an inlet for supplying a liquid to be filtered into the interior of the hollow discs;
   a container, in which the rotor is positioned, for receiving a filtrate passing through the filtering means;
   means for keeping the surface of the filtrate in the container at a level which is lower than the surface of the liquid in the hollow discs;
   a drive mechanism for rotating the filter rotor, whereby a pre-filtrate of said filtrate is developed in the container at the downwardly moving sides of the discs and a clear filtrate is developed in the container at the upwardly moving sides of the discs;
   pre-filtrate discharge means having a wall in the container defining a discharge passage;
   a pre-filtrate outlet connected to said discharge passage, said wall forming a number of openings positioned below said level and at the downwardly moving sides of the discs, whereby said pre-filtrate developing at the downwardly moving sides of the discs escapes through said openings into said discharge passage and through said pre-filtrate outlet; and
   a clear filtrate outlet connected to the container for discharging said clear filtrate therefrom, said wall with said openings having wall portions extending into interspaces between adjacent discs, each said wall portion being provided with a number of said openings.

2. The filtering apparatus of claim 1, wherein each wall portion forms a closed tube extending horizontally into the interspace between adjacent discs.

3. The filtering apparatus of claim 2, wherein each closed tube opens into an open channel extending axially along the discs, said channel forming part of said discharge passage for pre-filtrate.

4. The filtering apparatus of claim 2, wherein said wall forms a collection tube extending in the container axially along the discs, each of said closed tubes being connected to said collection tube, said collection tube being connected to said pre-filtrate outlet.

5. The filtering apparatus of claim 1, further comprising means for adjusting the effective flow area of said openings.

* * * * *